United States Patent [19]

Schulz et al.

[11] 4,402,143
[45] * Sep. 6, 1983

[54] BOTTOM FOR FLUIDIZED BED

[75] Inventors: Peter Schulz; Knut Vaupel, both of Essen; Jürgen Klein, Essen-Überruhr, all of Fed. Rep. of Germany

[73] Assignee: Bergwerksverband GmbH, Essen, Fed. Rep. of Germany

[*] Notice: The portion of the term of this patent subsequent to Sep. 1, 1998, has been disclaimed.

[21] Appl. No.: 249,661

[22] Filed: Mar. 26, 1981

Related U.S. Application Data

[63] Continuation of Ser. No. 34,439, Apr. 30, 1979, Pat. No. 4,286,393.

[30] Foreign Application Priority Data

May 9, 1978 [DE] Fed. Rep. of Germany ....... 2819704

[51] Int. Cl.³ .............................................. F26B 17/10
[52] U.S. Cl. .................................. 34/57 R; 34/57 A; 432/58; 239/557
[58] Field of Search .............. 34/10, 57 R, 57 A, 156, 34/155; 432/15, 58; 110/245, 234; 226/97, 196; 239/548, 557; 406/88, 89; 122/4 D

[56] References Cited

U.S. PATENT DOCUMENTS 3,272,415 9/1966 Wallin .................................. 226/97
4,332,218 6/1982 Stewart et al. ..................... 34/57 A

FOREIGN PATENT DOCUMENTS 2339964 2/1975 Fed. Rep. of Germany ........ 34/156

Primary Examiner—Larry I. Schwartz
Attorney, Agent, or Firm—Michael J. Striker

[57] ABSTRACT

A bottom for a fluidized bed conveyor is composed of a plurality of members provided with openings and located in contact with each other so that their points of contact are gas impermeable at least during operation of a fluidized bed. The openings may be formed as circumferentially closed holes and/or as laterally open recesses. The members may laterally abut against each other, or may be provided with interengaging lateral projections. The members may be located so that at cold temperatures small intermediate spaces remain therebetween, which spaces are closed during operation as a result of thermal expansion of the members under the action of high working temperatures. Bracing element or elements may be provided which urge the members toward one another.

8 Claims, 21 Drawing Figures

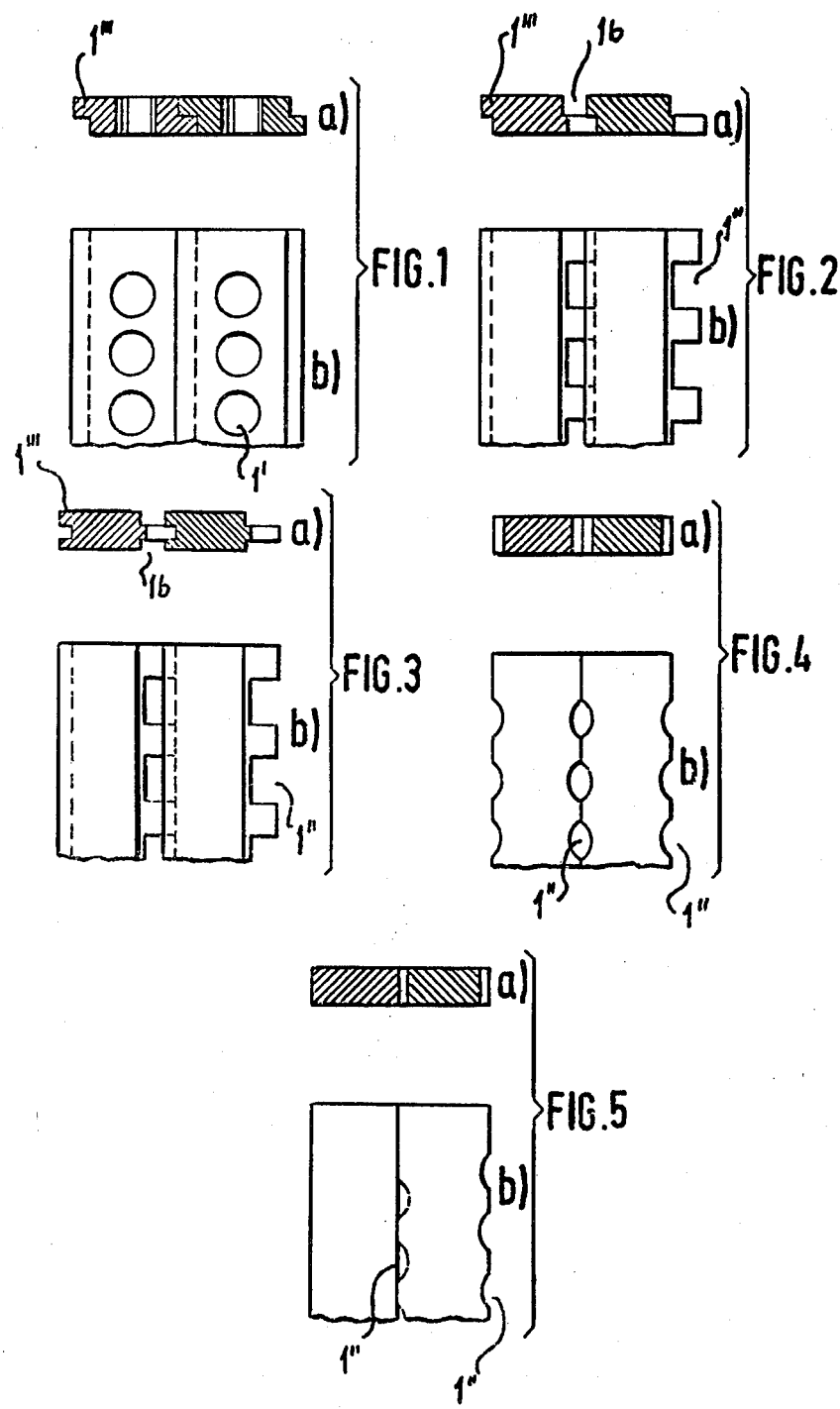

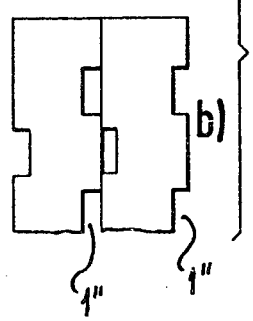
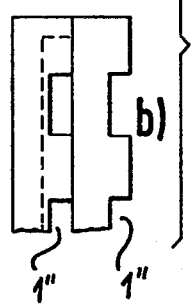
FIG. 6  FIG. 7
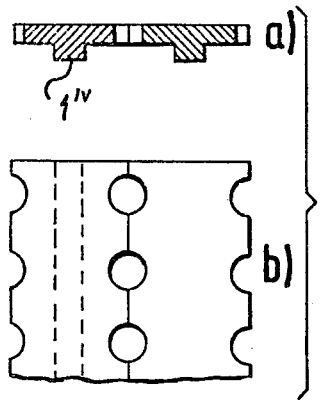
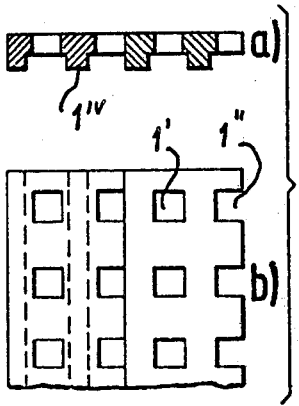
FIG. 8  FIG. 9

BOTTOM FOR FLUIDIZED BED

This is a continuation of application Ser. No. 34,439, filed Apr. 30, 1973 now U.S. Pat. No. 4,286,393.

BACKGROUND OF THE INVENTION

The present invention relates to a bottom for fluidized beds, particularly for fluidized bed conveyors.

Fluidized bed conveyors are utilized for treating solid particulate materials, for example for the purposes of drying of wet refuse, regeneration of activated absorption media, or for performing chemical reactions such as gasification or burning of coal. The fluidized bed conveyors provide for intensive material exchange and heat exchange. A fluidizing gas flows in the fluidized bed conveyors advantageously in a vertical direction, whereas a material which is treated travels under the action of constant vertical whirling movement along the fluidized bed conveyor from its inlet to its outlet. In practice, it is desirable to attain particularly intensive mixing or particularly uniform whirling conditions in dependence upon each particular application of the fluidized bed conveyor.

Intensive whirling action is attained by essentially different speeds of a flow of the fluidizing gas at various locations of the fluidized bed. In contrast, especially uniform whirling conditions is attained when the speed of the fluidizing gas in each point of the fluidized bed conveyor is permanently maintained certain multiple times higher than the point whirling speed of a solid particulate material which is treated in the container. The required speed of fluidizing gas is generally equal to between 0.05 and 5.0 m/sec, and the temperature of fluidizing gas is generally equal to between 300° K. and 1500° K., in dependence upon grain size and density of material to be treated as well as upon temperature and characteristics of the fluidizing gas. It has been recognized that when the fluidizing gas has an especially high temperature, such as above 700° K., fixedly set bottoms of the fluidized bed, particularly steel grates, are strongly warped. For this reason, they must be replaced, as a rule, when the fluidized bed is removed. The bottoms of metal alloys which have small thermal expansion reduce such warping; however, they are very expensive. On the other hand, in the case when solid particulate material is relatively heavy and thereby the fluidizing gas has a relatively high speed, it is recommended to provide for respectively heavier bottoms which excludes utilization of bottoms of solid layers. Finally, loosely placed bottoms have a further disadvantage that they are rarely correctly sealed at their edges, and thereby uncontrolled amounts of the fluidizing gas can enter the fluidized bed at these locations. Furthermore, the large bottoms such as massive grates are difficult to manipulate and cause difficulties during their replacement.

SUMMARY OF THE INVENTION

Accordingly, it is an object of the present invention to provide a bottom of a fluidized bed conveyor, which avoids the disadvantages of the prior art.

In keeping with these objects and with others which will become apparent hereinafter, one feature of the present invention resides, briefly stated, in that a bottom of a fluidized bed conveyor is composed of a plurality of members which are provided with a plurality of openings for passing a fluidizing gas, and adjoin each other and contact each other over contact points which are gas impermeable, at least during the operation of a fluidized bed accommodated in the container.

The members may be shaped and constituted of metal. They may laterally abut against and be flush with one another. On the other hand, they may be provided with lateral projections which are in contact with each other so that the members can move relative to one another when their projections are still in contact.

The members may be so located that small intermediate spaces remain therebetween in cold condition. However, during operation these intermediate spaces are closed as a result of thermal expansion of the members under the action of high working temperatures. Bracing means may be provided at one of two lateral sides of the bottom, which bracing means press the members toward one another in a direction transverse to a direction of elongation of the members. The members may be formed as cast members.

The members may be provided at their ends with end portions whose lower surfaces are flat and adapted to support on a supporting frame of the container. During thermal expansion of the members they can move in the longitudinal direction whereas the lower surfaces of the end portions slide over the supporting frame.

The openings of the members may be formed as circumferentially closed holes which are spaced from one another in the longitudinal direction and/or in the transverse direction. The openings may also be formed as recesses which are provided in one or two lateral edges of the members and laterally outwardly open. Finally, the openings may include both the circumferentially closed holes and the laterally open recesses.

Finally, the members may be provided with openings having differing sizes and/or numbers. The members may be so located relative to one another that the fluidizing gas has differing speeds at various locations of the fluidized bed conveyor.

The novel features which are considered as characteristic for the invention are set forth in particular in the appended claims. The invention itself, however, both as to its construction and its method of operation, together with addtional objects and advantages thereof, will be best understood from the following description of specific embodiments when read in connection with the accompanying drawings.

BRIEF DESCRIPTION OF THE DRAWINGS

FIGS. 1a–9a and 1b–9b are sections and plane views, respectively, of members which together form a bottom of a fluidized gas conveyor in accordance with several embodiments of the present invention;

FIG. 10b is a section taken along line A—A in FIG. 10a; and

FIG. 10c is a section taken along line B—B in FIG. 10a.

DESCRIPTION OF THE PREFERRED EMBODIMENTS

Figure 10A:
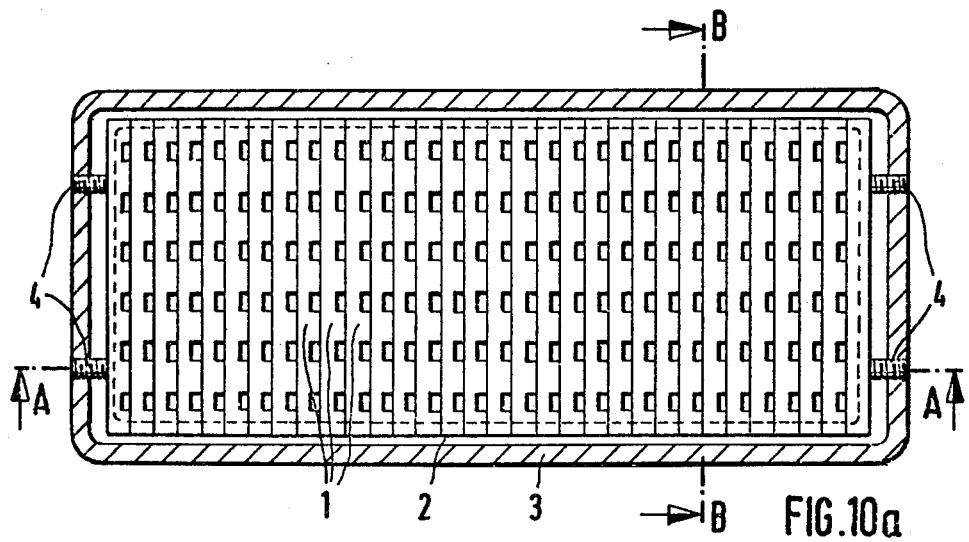
FIG. 10a is a plan view of the bottom in accordance with the present invention.

A bottom for a fluidized bed, or more particularly for a conveyor (i.e. trough) accommodating a fluidized bed is shown in the drawing. It is composed of a plurality of members 1. FIGS. 1a–9a show several cross-sections of a plurality of possible cross-sections of the members 1 in accordance with the present invention. As can be seen from these Figures, the members 1 are shaped members each having a plurality of openings through which a fluidized gas can pass. They may be constituted of metal.

The openings may be formed, for example, as a throughgoing perforation 1', e.g. holes which are produced by drilling or punching and are circumferentially closed. Such openings are shown in FIGS. 1a, 1b. The perforations 1' may be spaced from one another in both directions. Advantageously, the openings may be formed as lateral recesses 1" provided in a front edge and/or a rear edge of the shaped members 1, as shown in FIGS. 2a–8b. The lateral recesses 1" are easier to produce by casting of the shaped members 1, as compared with the holes 1' shown in FIGS. 1a, 1b.

The shaped members 1 may be provided with lateral projections 1''' which are in interengagement with each other as shown in FIGS. 1a–3b. On the other hand, the shaped members may be located flush with each other without lateral interengaging projections 1''' as shown in FIGS. 4a–9b. Whereas, FIGS. 1a, 1b show the openings which are formed as circumferentially closed holes 1' surrounded by portions of a material of the shaped members 1, and FIGS. 2a–8b show the openings formed as the laterally open recess 1", a combination of the above-mentioned two types of openings may be provided. FIGS. 9a, 9b show this combination. Each shaped member 1 has openings which are formed as the circumferentially closed holes 1' surrounded by portions of material, and openings which are formed as the laterally open recesses 1". This construction is especially advantageous when the bottom is utilized in conveyors which most accommodate a great quantity of fluidizing gas, and thereby a great number of openings is required.

The shaped members 1 shown in FIGS. 8a–9b are shaped so as to form reinforcing ribs $1^{IV}$ extending in a longitudinal direction. Such shaped members have high rigidity and, at the same time, their weight is not increased. For this reason, they do not considerably bend under the action of high temperatures and loads.

The shaped members 1 are supported on a supporting frame 2 by at least end portions of the shaped members. It is also possible that the shaped members are supported on the supporting frame by their other portions. The supporting frame advantageously allows the shaped members 1 to move in the longitudinal direction as a result of thermal expansion of the shaped members. This is shown particularly in FIG. 10a. An end portion of the shaped member 1 supports on the frame 2 provided with a lteral wall 3. A gap 1a remains between an end face of the end portion of the shaped member 1 and an inner face of the lateral wall 3 of the frame 2.

Figure 10B:
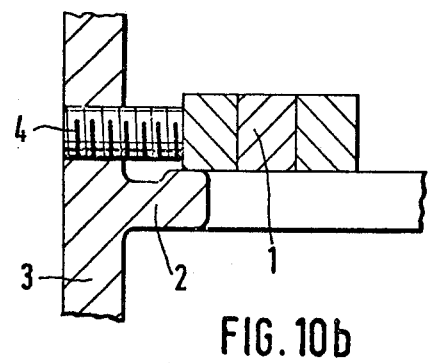
Figure 10C:
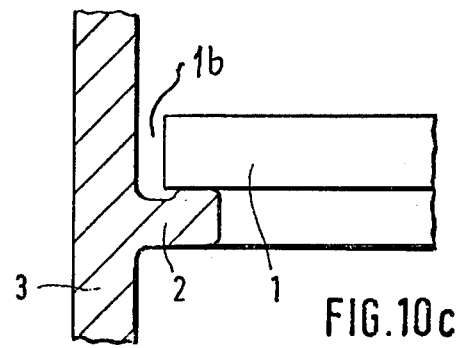

The arrangement also prevents passing of the fluidizing gas between the shaped members 1 and the frame 2. This may be attained in the following manner: The shaped members 1 are provided at their ends with a supporting portion whose lower side is formed as a flat uninterrupted surface as shown particularly in FIGS. 7a, 7b. This surface lies on the supporting frame 2 as shown in FIG. 10c. During the thermal expansion, the surfaces of the supporting portions of the shaped members move over the supporting frame 2. The supporting frame must be so worked that it operates as a blade over which the shaped members slide during the thermal expansion. Advantageously, the frame 2 has a flat and uninterrupted upper surface.

In accordance with the present invention, the shaped members 1 must be so located that at least during the operation of the fluidized bed contact points are gas impermeable. It is to be understood that in the case when the shaped members 1 are provided with lateral recesses 1" the impermeable contact points are formed by portions of the shaped members which are located between the lateral recesses 1". These are the portions which must be in gas impermeable contact with each other. The above-mentioned gas impermeability may be attained in the following manner.

One possibility is to lay the shaped members in cold state so that small intermediate spaces 1b remain therebetween. These spaces 1b must be such that when expected working temperatures of the fluidized bed are reached, the intermediate spaces become completely closed as a result of thermal expansion of the shaped members 1. In such case, displacement of the bottom in the transverse direction of the shaped members 1 as a result of thermal expansion, on the one hand, and passing of the fluidized gas through interstices and gaps outside of the predetermined openings are prevented. Thereby, controlled treatment of the material takes place. The width of the shaped members is equal, as a rule, to between 10 and 400 mm. The intermediate spaces 1b between the shaped members may have a width equal to between 0.1 and 10 mm, in dependence upon the width of the shaped members, the materials which are to be utilized, and the differentials between the temperature at which the shaped members are laid and the temperatures of the fluidized bed (for example, between 300° K. and 1300° K.).

Another possibility to attain gas impermeability is to provide bracing means at one or both sides of the bottom. This means must be so arranged that it acts upon an adjacent shaped member in a direction transverse to the longitudinal direction and thereby also acts laterally on all other shaped members, in the plane of the bottom. The more or less loosely arranged shaped members are laterally pressed by such bracing means toward one another so as to provide for the required gas impermeability of the contact points of the shaped members 1. The bracing means may be formed as a spring, a spindle, a hydraulic prop and the like. FIGS. 10a and 10b show such a bottom. The shaped members 1 lie on the frame 2 supported by the side walls 3. Bracing members 4 are mounted on the frame 2 or in the lateral wall 3 and act upon the shaped members 1 so that they are tightly pressed to each other at least in condition of maximum temperatures of operation of the fluidizing bed.

It should be emphasized that gas impermeability provided for preventing undesirable additional supply of fluidizing gas is referred to in this case only in a relative sense and not in the sense of gas impermeability which is utilized in vacuum devices. The openings for passing of the fluidized gas are so large as compared with the interstices and gaps 1b (essentially smaller than 0.1 mm) that in accordance with the principle of the smallest resistance the fluidizing gas passes practically exclusively through the former. It must here be taken into consideration that when the cross-section is becoming smaller, the quantities of gas which pass through the same follow the law of Hagen-Poiseuille, e.g. the quantity of gas which passes through the cross-section decreases as the fourth power of the diameter, when this cross-section corresponds to the dimensions of small gaps and interstices 1b between the shaped members, involved in the present invention.

It has been recognized that a further improvement is achieved by utilizations of cast parts as the shaped members 1. This is especially true with respect to simplicity of manufacture and thermal expansion of such shaped members.

The openings of the shaped members must be so dimensioned that their free cross-section is sufficient from passing the liquified gas at the working temperatures, in desired quantities. Especially advantageous is the combination of the shaped members having interengaging lateral projections 1''', with the openings for passing the fluidizing gas which are formed as the circumferentially closed holes 1', which is shown in FIGS. 1a, 1b. In this case, the intermediate spaces 1b during setting must not be maintained very accurately as a result of provision of the lateral projections 1''' and may be greater than required. This is advantageous for such small intermediate spaces 1b since, for example, the shaped members 1 can be displaced by other bracing means.

It is necessary to provide such free means 1b between the shaped members 1 and free spaces 1a at one or both ends of the fluidized bed, and to provide such longitudinal dimensions of the shaped members 1 which are necessary in the sense of thermal expansion of the shaped members 1 under the action of heating of the fluidized bed to working temperatures.

The shaped members 1 in accordance with the invention have the advantage that they can be easily replaced, if necessary, e.g. in the case when several openings are clogged or individual shaped members are warped as a result of aging effect. The separate shaped members are considerably easier to manipulate with that of a solid grate.

From the mechanical point of view, shaping of the members 1 makes possible to exclude an additional support which is required for solid grates. This is advantageous both in the sense of costs economy and of provision of uniform distribution of the fluidizing gas.

A further advantage of the inventive shaped members is that the speed of the fluidizing gas, especially in the longitudinal direction of the fluidized bed conveyor, can be varied. This is desirable, for example, when the material must be treated as uniformly as possible, but its density continuously varies during treatment. One of a typical example of this is gradual decline of density of the material in regeneration of wet absorption media, such as aluminum oxide or activated coal. Variations of the material density between inlet and outlet of the fluidized bed is at most equal to 50%. As a result of this, uncontrolled and undesirable intermixing, deformation, delay and deterioration (wear) of the solid particles in the fluidized bed conveyor take place, when the speed of the fluidized gas in the entire container is uniform, whereas the conditions of the fluidized bed are considerably different as a result of different density of the material. The shaped members provided with different numbers and/or sizes of the openings have different but predetermined permeability to the fluidizing gas. This means that respective shaped members 1 can be set at different locations of the fluidized bed conveyor, in dependence upon the required speed of the fluidized gas so as to satisfy the above-mentioned requirement made of the uniformity of the fluidized bed conditions.

The shaped members 1 in accordance with the present invention may also be utilized for solving problems which are already known in fluidized beds, such as to satisfy a requirement of providing for especially high intermixing. In this case the dimension and/or number of the openings are so selected that in side parts or in the center of the fluidized bed container the supplied quantity of the fluidizing gas is greater or smaller than at the other locations of the conveyor. It is known that this results in turbulence and mixing. The shaped members in accordance with the invention have a further advantage, as compared with the known bottoms, in that they do not warp under the action of higher temperatures, and only predetermined quantity of fluidizing gas can pass through them.

One of the most important advantages of the inventive bottom is that start and cessation of the fluidizing bed can follow after each other proactically as often as desired without buckling and warping of the bottom which take place in known bottoms or fluidized bed conveyors.

It will be understood that each of the elements described above, or two or more together, may also find a useful application in other types of constructions differing from the types described above.

While the invention has been illustrated and described as embodied in a bottom for a fluidized bed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bottom for a fluidized bed, particularly for a fluidized bed conveyor, comprising a plurality of elongated metal bar members arranged side-by-side in substantial parallelism and together forming said bottom, each of said bar members having a plurality of openings for passage of a fluidizing gas therethrough, and adjacent ones of said bar members engaging one another at contact locations which are gas impermeable at least during operation of the fluidized bed.

2. A bottom as defined in claim 1, wherein said bar members are profiled bar members.

3. A bottom as defined in claim 1, wherein said bar members have lateral edges which abut against each other during the operation.

4. A bottom as defined in claim 1, wherein said bar members are thermally expansible under the action of working temperatures of the fluidized bed, said bar members in said condition being so located relative to one another that relatively small intermediate spaces remain between said contact locations, said intermediate spaces substantially closing during the operation of the fluidized bed as a result of thermal expansion of said bar members under the action of the working temperatures.

5. A bottom as defined in claim 1, wherein said members are cast bar members.

6. A bottom as defined in claim 1, wherein said bar members each have two lateral edges spaced from one another in a direction which is transverse to their direction of elongation, said plurality of openings including recesses provided in at least one of said lateral edges and being laterally outwardly open.

7. A bottom as defined in claim 6, wherein said plurality of openings further includes further recesses which are provided in the other of said lateral edges and are laterally outwardly open.

8. A bottom as defined in claim 1, wherein the openings of said bar members have different total cross-sections for passing the fluidized gas therethrough, said bar members being so located relative to one another that the speeds of the fluidizing gas at various locations of the fluidized bed have different magnitudes.

* * * * *